Nov. 11, 1924.  
J. T. CUMBIE  
INSECT TRAP  
Filed July 14, 1923  
1,515,094
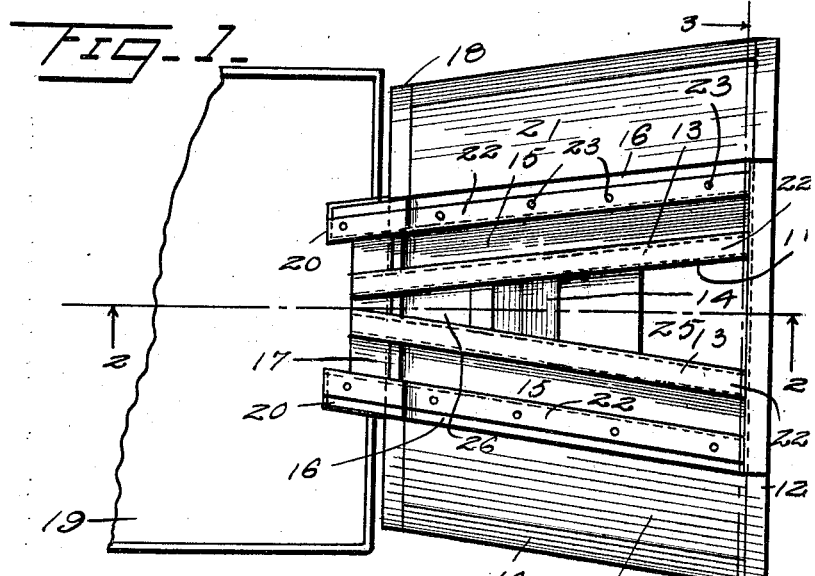
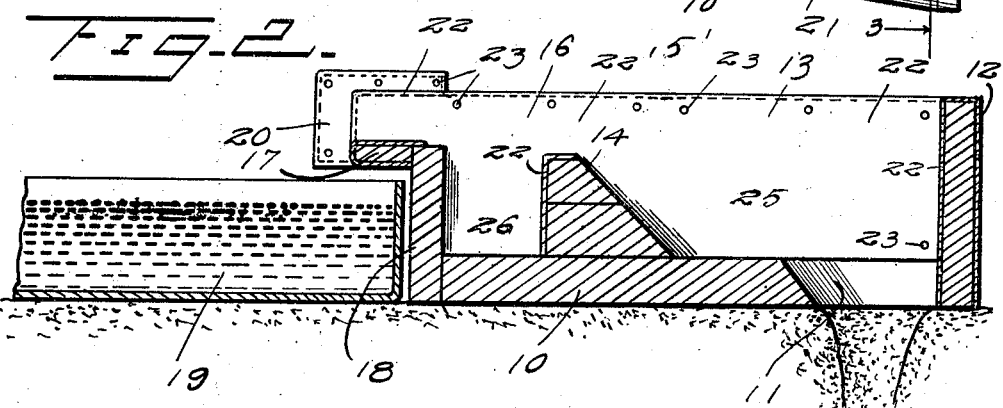
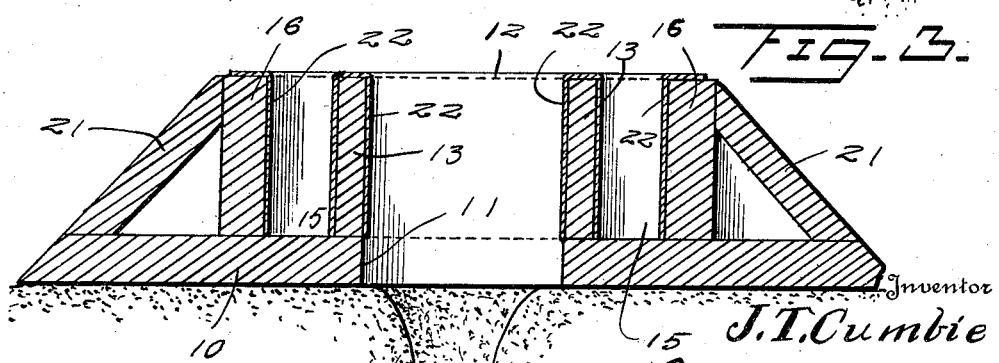

Patented Nov. 11, 1924.

1,515,094

UNITED STATES PATENT OFFICE.

JACOB T. CUMBIE, OF ORR, OKLAHOMA.

INSECT TRAP.

Application filed July 14, 1923. Serial No. 651,562.

*To all whom it may concern:*

Be it known that I, JACOB T. CUMBIE, a citizen of the United States, residing at Orr, in the county of Love and State of Oklahoma, have invented certain new and useful Improvements in Insect Traps; and I do hereby declare the following to be a full, clear, and exact description of the invention, such as will enable others skilled in the art to which it appertains to make and use the same.

The invention relates to traps for catching and destroying ants and like burrowing insects and has for its object the provision of a trap adapted to be located over an ant hill or burrow and of such construction as to catch the ants leaving the burrow and entrap the ants returning to the burrow, said trap including a receptacle containing an insecticide into which the entrapped insects are precipitated and destroyed.

Other objects and advantages will be apparent and suggest themselves as the nature of the invention is understood.

While the drawings illustrate an embodiment of the invention it is to be understood that in adapting the same to meet different conditions and requirements, various changes in the form, proportion and minor details of construction may be resorted to without departing from the nature of the invention.

Referring to the accompanying drawings forming a part of the application:

Figure 1 is a top plan view of a trap embodying the invention, a portion of the receptacle containing the insecticide being broken away, Figure 2 is a detail sectional view on the line 2—2 of Figure 1, and Figure 3 is a detail cross sectional view on the line 3—3 of Figure 1.

Corresponding and like parts are referred to in the following description and designated in the several views of the drawings by like reference characters.

The trap comprises a base 10, spaced longitudinal walls 13 and 16, front and rear walls 18 and 12, respectively, an intermediate wall 14, and laterally inclined approaches 21. These parts may be of any preferred construction. The longitudinal walls 13 and 16 are provided in pairs and are spaced apart to provide trap chambers 15 which are accessible by means of the inclined approaches 21. The pairs of walls tend to converge and enclose a space which is divided by the intermediate wall 14 to provide a receiving chamber 25 and a trap chamber 26. This space converges forwardly and has an entrance 11 in its rear bottom portion formed in the base 10. The walls of the several chambers are perpendicular and exceedingly smooth to prevent escape of the entrapped insects by climbing the same. The walls are rendered smooth by lining them with sheet metal 22 or in any other preferred way. The rear side of the intermediate wall 14 is inclined and of such formation as to enable the insects to obtain a footing thereon to climb from the receiving chamber 25 and precipitate into the trap chamber 26. The rear and side walls of the trap chamber 26 are smooth and metal lined to prevent the insects from obtaining a footing thereon. The inner side of the front wall 18 of the trap chambers 15 and 26 is sufficiently rough to enable the insects to crawl thereon and pass over the front wall 18 and drop from a ledge 17 into a receptacle 19 containing an insecticide. The surface of the ledge 17 is smooth to prevent the escape of the insects therefrom. Guards 20 are located at the ends of the ledge 17 to prevent escape of the insects after once reaching the ledge. This ledge 17 overhangs the receptacle 19 to cause the insects dropping therefrom to enter the receptacle 19 and become destroyed by the insecticide carried therein.

In practice the trap is placed over the ant hill or other insect abode, so that the opening 11 registers with the burrow, and as the insects emerge from the latter they enter receiving chamber 25 from which they can pass only by way of the wall 14 and upon reaching the top thereof they drop into the trap chamber 26 from which there is no escape except by way of the front wall 18. Upon reaching the ledge 17 the insects drop therefrom into the receptacle 19 and are destroyed by the insecticide contained therein. The ants returning to the burrow are confronted by the trap and climb the approaches 21 and drop from the tops of the walls 16 into the trap chambers 15 from which there is no escape except by way of the front wall 18, up which they climb and drop from the ledge 17 leading from the top thereof and fall into the receptacle 19 in which they are destroyed in the manner herein stated.

What is claimed is:

1. A trap of the class described having longitudinally extending converging walls in spaced relation, the trap having a trap chamber intermediate said walls, said walls at one end projecting beyond the trap chamber, a ledge joining said walls beyond the trap chamber, a destroyer, and said ledge being elevated with respect to the base of the trap so as to overlap the destroyer.

2. A trap of the class described having longitudinally extending converging walls, approaches exteriorly of said walls and inclined with respect thereto, the trap having a captive chamber intermediate said walls, a ledge on said trap elevated with respect to its base and adapted to overlap a destroyer, said ledge being in the path of travel of insects from said chamber, and said side walls extending above said ledge and to the rear edge of said ledge.

3. A trap for burrowing insects comprising spaced longitudinal trap chambers and an intermediate receiving and trap chamber, approaches leading to the longitudinal trap chambers, the several trap chambers having exits leading to a destroyer and the receiving chamber having an opening in its bottom to register with the burrow and an exit leading to the intermediate trap chamber.

4. A trap for burrowing insects comprising longitudinal converging trap chambers spaced apart and enclosing a space which is divided to provide a receiving chamber and a trap chamber, the receiving chamber having an opening to register with the burrow and an exit ledge to the intermediate trap chamber, the several trap chambers having exits leading to a destroyer and approaches leading to the longitudinal trap chambers.

5. A trap for burrowing insects comprising longitudinal trap chambers spaced apart and oppositely inclined to include a space which is divided to provide a receiving chamber and a trap chamber, the receiving chamber having an opening to register with the burrow and an exit ledge to the intermediate trap chamber, the several trap chambers having exits leading to a destroyer, and laterally inclined approaches at the outer side of the longitudinal trap chambers.

In testimony whereof I affix my signature in presence of two witnesses.

JACOB T. CUMBIE.

Witnesses:
H. R. HARPER,
E. F. GILCREASE.